United States Patent
Stamos et al.

(10) Patent No.: US 11,080,255 B2
(45) Date of Patent: Aug. 3, 2021

(54) SPACE-EFFICIENT BOOKKEEPING FOR DATABASE APPLICATIONS

(71) Applicant: Oracle International Corporation, Redwood Shores, CA (US)

(72) Inventors: James W. Stamos, Saratoga, CA (US); Mukesh Jaiswal, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 16/030,757

(22) Filed: Jul. 9, 2018

(65) Prior Publication Data
US 2020/0012736 A1   Jan. 9, 2020

(51) Int. Cl.
*G06F 16/22* (2019.01)
*G06F 16/23* (2019.01)

(52) U.S. Cl.
CPC .......... *G06F 16/2282* (2019.01); *G06F 16/23* (2019.01)

(58) Field of Classification Search
CPC . G06F 16/2282; G06F 16/23; G06F 16/24569
See application file for complete search history.

(56) References Cited

U.S. PATENT DOCUMENTS

| | | | | |
|---|---|---|---|---|
| 6,535,917 | B1* | 3/2003 | Zamanzadeh | G06F 21/34 707/999.009 |
| 2004/0186996 | A1* | 9/2004 | Gibbs | H04L 63/123 713/168 |
| 2007/0274303 | A1* | 11/2007 | Cui | G06F 12/023 370/363 |
| 2016/0110391 | A1* | 4/2016 | Korycki | G06F 16/2282 707/741 |

* cited by examiner

*Primary Examiner* — Irete F Ehichioya
*Assistant Examiner* — Xiaoqin Hu
(74) *Attorney, Agent, or Firm* — Hickman Becker Bingham Ledesma LLP

(57) ABSTRACT

A method is provided for space-efficient bookkeeping using bit-level locking. Each row of a bookkeeping table stores binary data comprising a plurality of bits. Each bit of the plurality of bits corresponds to a particular message and a particular consumer of the message, and indicates whether the particular message has been dequeued by the particular consumer. The bookkeeping table is stored on-disk and data corresponding to the bookkeeping table is stored in volatile memory. When a message is dequeued the in-memory bookkeeping data is updated, and the bookkeeping table is updated based on the in-memory bookkeeping data when the dequeue is committed.

18 Claims, 5 Drawing Sheets

| COLUMN 260 | COLUMN 270 | COLUMN 272 | COLUMN 274 | COLUMN 276 | COLUMN 278 |
|---|---|---|---|---|---|
| SEQUENCE_NUM | DEQ_STATUS_0 | DEQ_STATUS_1 | DEQ_STATUS_2 | DEQ_STATUS_3 | DEQ_STATUS_4 |
| 0 | 000...0011 | 000...0000 | 000...0000 | 000...0000 | 000...0000 |
| 1 | 000...0000 | 000...0000 | 000...0000 | 000...0000 | 000...0000 |

BOOKKEEPING TABLE 250

| MESSAGE_NUM | DEQUEUE_STATUS |
|---|---|
| 0 | 1 |
| 1 | 1 |
| 2 | 0 |
| ... | ... |
| 997 | 0 |
| 998 | 0 |
| 999 | 0 |

MESSAGE NUMBER COLUMN 110
DEQUEUE STATUS COLUMN 120
BOOKKEEPING TABLE 100

FIG. 1

| SEQUENCE NUMBER COLUMN 210 | DEQUEUE STATUS COLUMN 220 |
|---|---|
| SEQUENCE_NUM | DEQUEUE_STATUS |
| 0 | 00000...00011 |
| 1 | 00000...00000 |

BOOKKEEPING TABLE 200

FIG. 2A

| COLUMN 260 | COLUMN 270 | COLUMN 272 | COLUMN 274 | COLUMN 276 | COLUMN 278 |
|---|---|---|---|---|---|
| SEQUENCE_NUM | DEQ_STATUS_0 | DEQ_STATUS_1 | DEQ_STATUS_2 | DEQ_STATUS_3 | DEQ_STATUS_4 |
| 0 | 000...0011 | 000...0000 | 000...0000 | 000...0000 | 000...0000 |
| 1 | 000...0000 | 000...0000 | 000...0000 | 000...0000 | 000...0000 |

BOOKKEEPING TABLE 250

FIG. 2B

SPACE-EFFICIENT BOOKKEEPING FOR DATABASE APPLICATIONS

FIELD OF THE INVENTION

The present invention relates to database management systems, and specifically to techniques for space efficient bookkeeping for database application message queues.

BACKGROUND

Some software applications capture input data and asynchronously process the data in a first-in, first-out (FIFO) manner. Example applications may include message brokers, systems that support asynchronous requests, systems that process data streams, etc. The enqueued messages may be retained for the amount of time needed to process the data, or for a longer, specified duration. In these applications, one or more message consumers process each enqueued message once. To achieve high processing throughput, multiple dequeue sessions may be used to process enqueued data on behalf of a given consumer. During any given interval of time, the dequeue order from a message queue by a consumer may be a strict FIFO ordering, a mostly FIFO ordering, or an arbitrary ordering. A database system may be used to run these FIFO processing applications in order to utilize database functionality such as transactions and/or to integrate with data already stored in the database.

A bookkeeping table tracks the messages that have been enqueued and which messages have been dequeued. In a typical message processing system implemented using a database, a single-consumer queue with M messages is associated with a bookkeeping table that has M rows, where each row indicates whether the corresponding message has or has not been successfully dequeued.

In a multi-consumer queue, an enqueued message with N consumers is associated with N rows, where each row for the message indicates whether the corresponding consumer has or has not successfully dequeued the message. A dequeue session for the i-th consumer locks the i-th row to get exclusive access to the associated message on behalf of the i-th consumer, updates the row to indicate the message has been dequeued by the i-th consumer, processes the dequeued message, and commits the transaction. Each consumer requires its own bookkeeping row for the message so that different consumers can dequeue the message concurrently without encountering lock conflicts on a bookkeeping row. Thus, for M messages and N consumers, a bookkeeping table would require M*N rows, which is an inefficient use of storage space.

One possible solution is to track the latest message dequeued for each consumer. For example, if ten messages were enqueued and the consumer had dequeued five, a high-water mark of five would be tracked. However, this requires that only one thread, or dequeue session, processes messages for each consumer. As discussed above, to improve processing throughput, it is desirable to allow multiple sessions to dequeue or process messages on behalf of the same consumer at the same time. Furthermore, tracking the latest message dequeued does not allow the system to dequeue out of order, commit transactions out of order, and roll back to save points.

Another possible solution is to utilize a different column for each consumer, where each row corresponds to a message and each column corresponds to a consumer of that message. Utilizing column-level locking, a first process can modify a first column in a row, while another process can modify another column in the same row, and the locks won't conflict. Column-level locking, however, is not typically used because it results in a higher processing overhead. In addition, due to additional data needed to store columns of a table, the storage requirement for a single-bit column may actually be one or more bytes, so having many columns would significantly increase space requirements.

In the presence of many consumers and/or high message throughput, a more space-efficient bookkeeping method that does not constrain a dequeue application nor present significant space requirements is desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a block diagram illustrating a row-level bookkeeping table.

FIG. 2A is a block diagram illustrating a bit-level bookkeeping table.

FIG. 2B is a block diagram illustrating a bit-level bookkeeping table.

DETAILED DESCRIPTION

Figure 3:
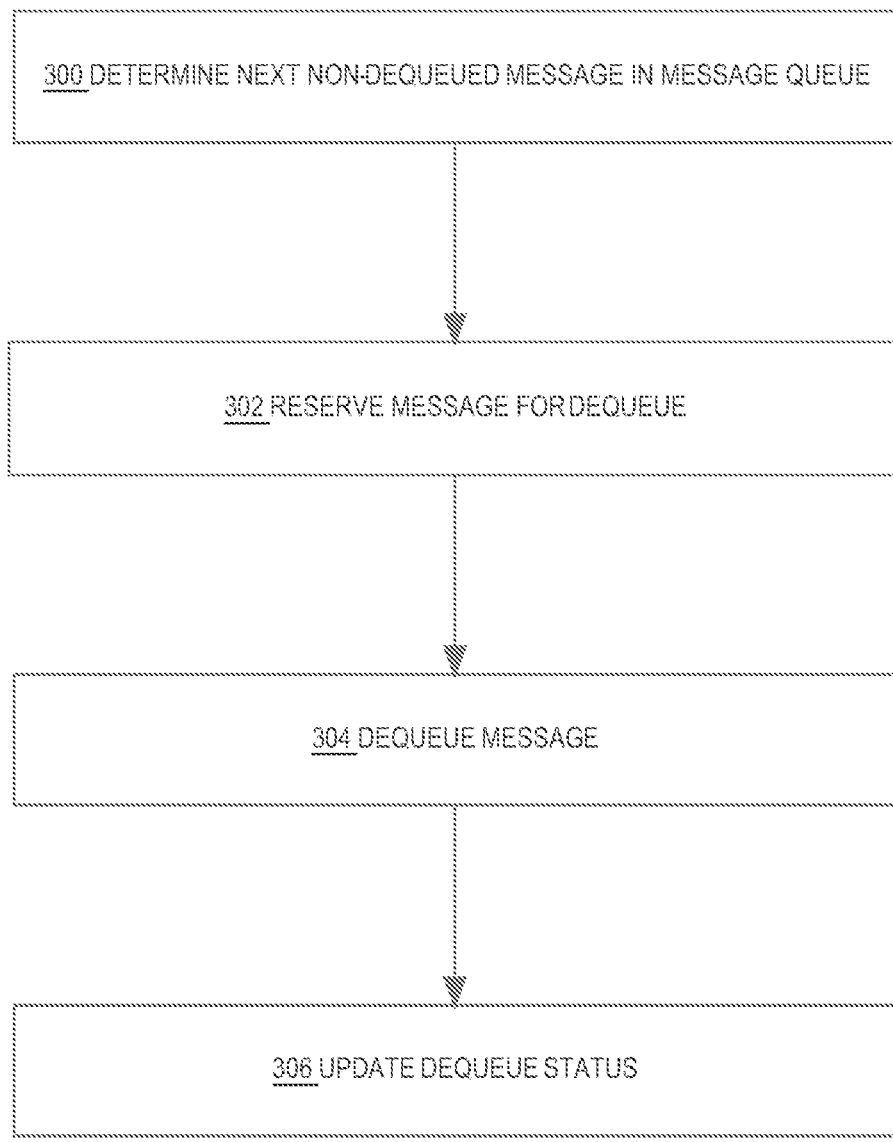
FIG. 3 is a flowchart illustrating steps for dequeuing a message.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for space-efficient bookkeeping using bit-level locking. Rather than allocating a separate bookkeeping row for each consumer of each message, multiple bits are packed into the same bookkeeping row. A consumer is an entity, such as a database application, that consumes messages. A single consumer may use any number of dequeue sessions to consume messages from a message queue. If a plurality of dequeue sessions consume messages for the same consumer, each dequeue session for the consumer coordinates its message consumption with the other dequeue sessions so that the same message is not consumed more than once by the consumer. Although single consumer queues and multi-consumer queues are described herein, any type of queue may be used, including sharded queues.

In an embodiment, each row of a bookkeeping table stores binary data comprising a plurality of bits. Each bit of the plurality of bits corresponds to a particular message and a particular consumer of the message, and indicates whether the particular message has been dequeued by the particular consumer. For example, assume a row corresponds to messages enqueued for a particular consumer. The first bit may indicate the dequeue status of the first message enqueued for the particular consumer, the second bit may indicate the dequeue status of the second message enqueued for the particular consumer, and so on. A 0 bit may indicate that the corresponding message has not been dequeued, and a 1 bit may indicate that the message has been dequeued.

In an embodiment, the bookkeeping table is persistently stored on-disk. Data corresponding to the bookkeeping table is also stored in volatile memory. When a message is first dequeued by a dequeue session, the message is marked as dequeued in the in-memory data. Updating the in-memory data does not result in column-level or row-level lock conflicts for the duration of a transaction, so several bits may be updated at the same time, or approximately the same time, for the same message and/or consumer by different dequeue sessions. When a dequeue session commits the dequeue, the relevant data stored in the bookkeeping table is synchronized with the in-memory bookkeeping data. Based on the in-memory bookkeeping data, the bits stored in the bookkeeping table that correspond to messages dequeued by the dequeue session are updated to indicate that the messages have been dequeued.

Bookkeeping Table Overview

A bookkeeping table, also known as a dequeue log table, tracks the dequeue status of messages by consumers. In an embodiment, the bookkeeping table corresponds to a particular message queue. The bookkeeping table tracks the dequeue status of messages in the message queue by consumers. Additionally, the database system may store data indicating which consumers dequeued which messages. If there are multiple message queues, the dequeue status of each message queue in the database system may be stored in separate bookkeeping tables. In other embodiments, a single bookkeeping table may correspond to a plurality of message queues and track the dequeue status for messages in the plurality of message queues. In addition, the database system may store data indicating which messages correspond to which message queues.

FIG. 1 illustrates a traditional bookkeeping table 100. Typically, a bookkeeping table tracks one message per consumer, per row. For the purpose of illustrating a clear example, assume bookkeeping table 100 tracks the dequeue status of 1000 messages for a single consumer. Bookkeeping table comprises 1000 rows, corresponding to each message enqueued for the consumer. The bookkeeping table comprises two columns, a message number column 110 and a dequeue status column 120. The message number column 110 stores data identifying the message corresponding to each row, and the dequeue status column 120 stores data indicating the dequeue status for the corresponding message. In the illustrated example, message 0 and message 1 are dequeued, as illustrated by the "1" value stored in the dequeue status column 120.

To reduce the space required by the bookkeeping table, rather than tracking one message per consumer per row, each row tracks the dequeue status of a plurality of messages and/or a plurality of consumers. For example, each row may correspond to a particular message enqueued for one or more consumers and track the dequeue status for each of the one or more consumers. Alternately, each row may correspond to a particular consumer and track the dequeue status of a plurality of messages enqueued for the particular consumer. Additionally or alternatively, each row may track the dequeue status of a plurality of messages by a plurality of consumers.

In an embodiment, each row includes one or more columns storing binary data that comprises a plurality of bits. Each bit indicates the dequeue status of a particular message for a particular consumer. For example, a zero bit may indicate that the corresponding message has not been dequeued and a one bit may indicate that the corresponding message has been dequeued. Alternately, a zero bit may indicate a message has been dequeued while a one bit indicates a message has not been dequeued. Alternatively, a plurality of bits can be used for each message-consumer pair to represent more states in the bookkeeping table than binary states. For example, in an acknowledgement-based notification system, even if a message is dequeued and committed by a notifier process acting as a message consumer, the message can be removed from the system only after the message is acknowledged by the client as having been processed. The acknowledgement can come through a parallel client session.

In an embodiment, each row corresponds to a particular consumer, and the bits stored in each row correspond to the messages enqueued for the particular consumer. In another embodiment, each row corresponds to a particular message, and the bits stored in each row correspond to the consumers for the particular message. Alternately, a combination of techniques may be used such that each row corresponds to one or more consumers of one or more messages. The particular method by which bits are correlated with messages and consumers may vary depending on the dequeue workload or on an expected dequeue workload.

As an example, some queuing systems let a client dequeue multiple messages in a single dequeue call in order to avoid multiple round trips to the server. Normally, a dequeue call dequeues a single message from the queue. A round trip to the server is involved in each and every dequeue call submitted by a client. The maximum number of messages dequeued in a single dequeue call can be controlled by the client. Such array dequeues or batched dequeues result in better throughput as compared to multiple single dequeues.

In the above example, correlating consecutive messages in a single row of the bookkeeping table reduces the working set size and favors array-based dequeue of consecutive messages, but may lead to update contention if multiple sessions attempt to update the same block.

As another example, bits for consecutive messages may be assigned to different bookkeeping rows and/or different data blocks, which reduces update contention but increases the working set size.

In an embodiment, each row includes an identifier column that stores an identifier value for the row. If rows each correspond to a particular message, the identifier value may indicate the corresponding message. As an example, the identifier column may store numeric identifiers corresponding to a message number of the corresponding messages. As another example, if each row corresponds to a particular consumer, the identifier value may indicate the corresponding consumer.

In another embodiment, the identifier column stores a row index value. The row index value identifies the particular row of the bookkeeping table, and may be used to determine which rows of the bookkeeping table record bookkeeping information for which messages. For example, each message number may be mapped to a particular row index value. If the dequeue state of the N-th message is kept in the N-th bit, then N may be mapped to the index value of the bookkeeping row containing the bit. In addition, N may also be mapped to an offset for the particular row. As an example, assume each row stores 100 bits. Then the first row stores the dequeue status for messages 0-99, the second row stores the dequeue status for messages 100-199, and so on. The message number 102 would be mapped to the third bit of the second row. To find the bit corresponding to message 102, the second row would first be identified, and then the third bit from the row would be retrieved or accessed. In an embodiment, if a partitioning scheme is used for bookkeeping information, a mapping may be used that maps a message range to the partition responsible for the range.

FIG. 2A illustrates an example bit-level bookkeeping table. For the purpose of illustrating a clear example, assume bookkeeping table 200 tracks the dequeue status of 1000 messages for a single consumer. In the illustrated example, bookkeeping table 200 comprises a sequence number column 210 and a dequeue status column 220. Each row stores 500 bits in dequeue status column 220, corresponding to the dequeue status of 500 messages. Thus, the row with sequence number 0 tracks the dequeue status for the first 500 messages, and the row with sequence number 1 tracks the dequeue status for the next 500 messages. In the illustrated example, message 0 and message 1 have been dequeued, as indicated by the 1 bit in the corresponding dequeue status bit. The remaining messages have not been dequeued, or have not been enqueued for the consumer, and have a 0 bit in the corresponding dequeue status bit.

In an embodiment, the database system may update the value of a single bit by updating the value stored in the entire column. Similarly, a redo operation may generate a new copy of a value, rather than identifying the difference between the current value and the redo value and changing only the different bits. In order to avoid rewriting large amounts of data on each update and/or redo, multiple smaller columns may be used for storing dequeue status bits.

FIG. 2B illustrates an example bit-level bookkeeping table with multiple queue status columns. For the purpose of illustrating a clear example, assume bookkeeping table 250 also tracks the dequeue status of 1000 messages for a single consumer. In the illustrated example, bookkeeping table 250 comprises a sequence number column 260 and five dequeue status columns 270-278. Each row stores 500 bits, corresponding to 500 messages, and each dequeue status column stores 100 bits. Thus, the first column of the first row tracks the dequeue status for message 0-99, the second column tracks the dequeue status for message 100-199, and so on.

In-Memory Bookkeeping Data

Typically, if multiple sessions are dequeuing messages on behalf of a single consumer, row locks may be used to synchronize the bookkeeping data in the bookkeeping table. In an embodiment, rather than using row locks to synchronize data, in-memory bit-level locks are used. The bookkeeping table is stored persistently on disk, and data corresponding to the bookkeeping table is also stored in volatile memory. Similar to the on-disk bookkeeping table, the in-memory data comprises a plurality of bits that indicate the dequeue status of messages by consumers. The plurality of bits may be stored in memory, for example, as one or more sets of bits or bit-strings, a table structure similar to that of the bookkeeping table, or using any other suitable data structure. The in-memory bits may be locked on a bit-by-bit basis, rather than having to lock the entire row in which a bit is stored. Therefore, many dequeue sessions can modify the in-memory bookkeeping data at the same time.

When a message is first dequeued, the message is marked as dequeued in the in-memory data. Since updating the in-memory data does not result in column-level or row-level lock conflicts for the duration of a transaction, several bits may be updated at approximately the same time by different dequeue sessions. As explained in further detail below, when the dequeue session commits the dequeue, the on-disk bookkeeping table is synchronized with the relevant changes to the in-memory bookkeeping data. The bits stored in the bookkeeping table that correspond to messages dequeued by the dequeue session are updated to indicate that the messages have been dequeued. Additionally, transaction aborts and transaction rollbacks to a save point may be performed by discarding dequeue information or reservations for affected messages from the in-memory bookkeeping data.

In an embodiment, sets of two or more bits in memory correspond to a respective bit in the bookkeeping table. In addition to whether the message has been dequeued, each set of two or more bits indicates whether the corresponding message has been reserved by a dequeue session for dequeuing and/or whether the dequeue transaction has been committed. For example, assume a set of two bits indicates the dequeue status of a particular message by a particular consumer. A "00" may indicate that the message has not been dequeued. A "01" may indicate that the message is being dequeued, or reserved for dequeuing, by a dequeue session, but has not been dequeued. A "10" may indicate that the message has been dequeued, but the transaction has not been committed. That is, the in-memory dequeue status for the message has not been synchronized with the on-disk bookkeeping data. A "11" may indicate that the message has been dequeued and the dequeue transaction has been committed.

In addition, the in-memory data may comprise data indicating the message number of the particular message and/or the particular consumer for each message. The additional data may be used to identify, given a set of bits corresponding to a particular message, a corresponding row of the on-disk bookkeeping table and the location of the corresponding bit within the corresponding row.

In an embodiment, the in-memory data may be compressed. For example, for a FIFO dequeue order, for a given consumer there may be a long stretch of dequeued messages, a short run of uncommitted dequeued messages and recently committed dequeued messages, followed by a stretch of non-dequeued messages. The stretches of dequeued and non-dequeued messages may be compressed to save space in memory. Any suitable data compression algorithm may be used. Similarly, the data in the rows of the bookkeeping table may also be compressed. The data compression algorithms and compression timing for the cache and the rows may be the same or may be different, depending on the particular implementation.

FIG. 3 illustrates example steps for dequeuing messages from the message queue.

At step 300, a dequeue session determines the next non-dequeued message that has not been dequeued nor reserved for dequeue by another dequeue session. A dequeue session dequeues messages on behalf of a particular consumer. The dequeue session determines, based on the in-memory bookkeeping data, the next message for the consumer that has not been dequeued or reserved for dequeue. Referring to the above example, assume sets of two bits are used to indicate the dequeue status of a particular message by a particular consumer. The dequeue session may identify the next message that has a bit value of "00," and selects the message for dequeuing.

Additionally, the database system may track the sequence number, or other message identification information, of the last message in the message queue. If the last message in the message queue has been dequeued, or reserved for dequeue, then no non-dequeued messages remain. For example, assume message number 5 is the highest message number in a message queue. If message numbers 0-5 have each been dequeued or reserved, then the dequeue session determines that no messages are left to dequeue. In an embodiment, in response to determining that no messages are available for dequeue, the dequeue session stops dequeuing messages. In other embodiments, the dequeue session may wait for another message to be enqueued in the message queue, then selects the new message for dequeuing.

At step 302, if the dequeue session selected a message to dequeue, the dequeue session reserves the message for dequeue. In an embodiment, reserving the message for dequeuing comprises updating the in-memory data corresponding to the message to indicate that the message has been reserved. Referring to the above example, the dequeue session may update the set of bits corresponding to the message to a value of "01."

Additionally, the dequeue session may implicitly or explicitly mark the dequeue as needing a deferred update to the on-disk bookkeeping table. A deferred update to the on-disk bookkeeping data waits until a transaction, such as the transaction dequeuing messages, commits before updating the on-disk bookkeeping table based on the in-memory bookkeeping data. Alternately, the dequeue session may update the on-disk bookkeeping table as messages are dequeued, although this approach may lead to application stalls or deadlocks.

In an embodiment, if sets of two or more bits indicate the dequeue status of a message, the value of a particular bit may correspond to whether the bookkeeping table needs updating. For example, if sets of two bits are used to indicate the dequeue status of a message, the first bit may indicate the dequeue status of the message and the second bit may indicate whether the corresponding bit in the bookkeeping table has been updated. In another embodiment, different combinations of bit values may indicate a different status. Referring to the above examples, "01" may indicate that the message has been reserved for dequeue but not dequeued, while "10" indicates that the message has been dequeued but the bookkeeping table has not been updated. In other embodiments, the in-memory data may separately store data indicating which portions of the bookkeeping table need to be updated.

At step 304, the dequeue session proceeds as usual to dequeue the message and process the dequeued message.

At step 306, after the message is dequeued, the dequeue session may update the in-memory bookkeeping data to indicate that the message has been successfully dequeued.

Bookkeeping Table Synchronization

In an embodiment, the on-disk bookkeeping table is updated after a dequeue session issues a commit request. In response to the dequeue session issuing a commit request, the on-disk bookkeeping table is updated based on the in-memory bookkeeping data. The in-memory bookkeeping data indicates which messages were dequeued by the dequeue session but have not been committed. The corresponding bits in the on-disk bookkeeping table are updated accordingly.

In an embodiment, to minimize overhead when updating the bookkeeping table, all bits in the same bookkeeping row that need an update are updated at the same time. As discussed above, the in-memory booking data may indicate which bits in the bookkeeping table need to be updated. Based on all the bits that need updating, a plurality of rows that need updating are determined. Each row of the plurality of rows is then updated, where updating the row updates all bits in the row that need an update. The plurality of rows may be sorted and updated in order so as to avoid deadlocks. The rows may be sorted based on queue identifier, shard identifier, and a numeric identifier column.

In an embodiment, the sorting and updating of a plurality of bookkeeping rows are performed by the database system in a pre-commit callback, also known as a pre-commit trigger. A pre-commit callback is a function that is executed prior to committing a database transaction. The database transaction being committed may be, for example, the transaction whose dequeue sessions dequeued one or more messages. Each update to a bookkeeping row may be done with SQL or via a low-overhead, internal application programming interface (API).

In an embodiment, a bit-level lock request on the bookkeeping table respects a conventional lock on the bookkeeping row, data block, or table containing the bit, and vice versa. Database views that list database sessions holding locks and database sessions waiting for locks may list both in-memory bit-level locks and conventional row locks in the database. Local deadlock detection algorithms and global deadlock detection algorithms also consider the bit-level locks in addition to the conventional locks in the database. Additionally or alternatively, database sessions could be prevented from waiting on locked bookkeeping rows by prohibiting database clients from directly updating or deleting such bookkeeping rows.

In an embodiment, a single dequeue may be automatically committed. The dequeue session updates the appropriate bit in the bookkeeping table at the conclusion of the dequeue and immediately commits the dequeue transaction. In an embodiment, a single array-based dequeue may be automatically committed. When a single array-based dequeue auto-commits, a pre-commit callback does not need to be used. The dequeue session updates the appropriate bits at the conclusion of the dequeue and then commits the dequeue transaction. In an embodiment, when a dequeue session does the last dequeue(s) corresponding to the bits stored in a bookkeeping row, the dequeue session updates the bookkeeping row at the end of the last dequeue. These approaches minimize or eliminate the update work done in a pre-commit callback without causing any application stalls or deadlocks.

Figure 4:
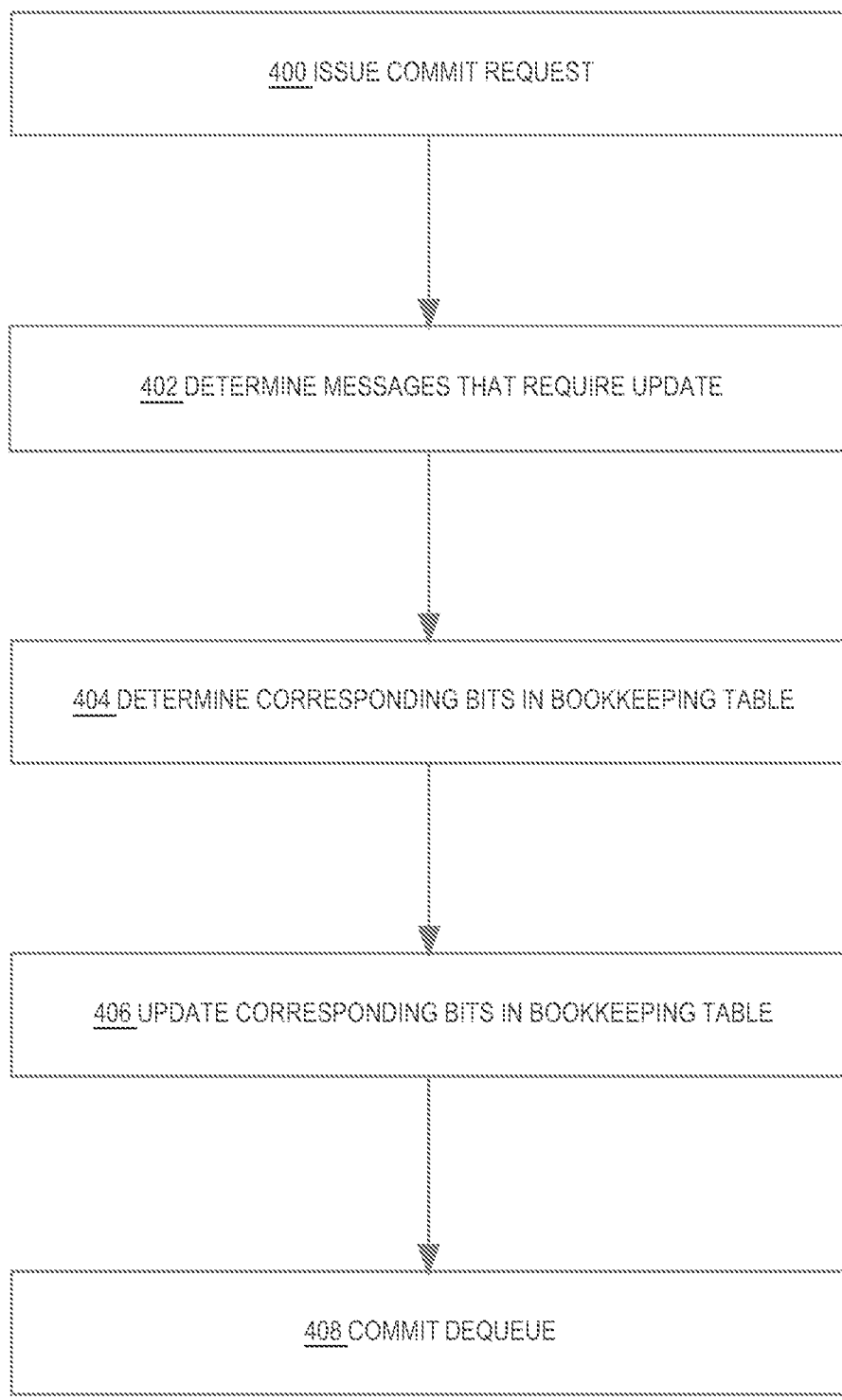
FIG. 4 is a flowchart illustrating steps for committing a dequeue.

FIG. 4 illustrates example steps for updating an on-disk bookkeeping table.

At step 400, the dequeue session issues a commit request to commit the message dequeues it performed. After issuing the commit request, at step 402, the dequeue session determines the messages it dequeued that required a deferred update to the on-disk bookkeeping table. The determination may be based on one or more messages indicated by in-memory bookkeeping data as needing an update in the bookkeeping table.

At step 404, the dequeue session determines the bits in the bookkeeping table corresponding to the messages that need a deferred bit-level update in the bookkeeping table. In an embodiment, the dequeue session determines the corresponding bits based on a mapping of message identifier to a database row or to a data block storing the database row.

At step 406, the dequeue session updates the corresponding bits in the bookkeeping table. In an embodiment, to avoid deadlocks with other dequeue sessions, the dequeue session updates bookkeeping rows in an order. In an embodiment, a dequeue session determines the rows containing bits to update, sorts the rows according to their queue identifier, shard identifier, and numeric identifier column, and updates the rows in that order. For each row, the dequeue session acquires a lock on the bookkeeping row, updates the bookkeeping row, and releases the lock once the transaction is committed.

At step 408, the dequeue is committed.

If each bookkeeping row has bits for only a single consumer, and a consumer does not have multiple concurrent dequeue sessions, several possible techniques may be used to update the bookkeeping table. In one embodiment, the dequeue session can update each bit synchronously as part of the dequeue for that consumer. In another embodiment, the dequeue session batches bit updates for that consumer in order to minimize the number of bookkeeping row updates. Alternately, the dequeue session can defer all bookkeeping row updates to the pre-commit callback.

Conversion Between Bit-Level and Row-Level Bookkeeping

A consumer that currently uses row-level bookkeeping may be changed to use the bit-level bookkeeping techniques described above, and vice-versa. The conversion may be performed in either an online manner or an offline manner.

In an embodiment, to convert a consumer to/from bit-level bookkeeping in an offline manner, dequeues are disabled for the consumer. After in-progress dequeues either finish committing or abort, the bookkeeping information is changed to the new format. After the bookkeeping information format is changed, dequeues are re-enabled for the consumer.

In an embodiment, to convert a consumer to/from bit-level bookkeeping in an online manner, the latest message whose dequeue has been committed is identified. A particular message that is later in the queue than the identified message is selected. The previous bookkeeping format is used for messages up to the particular message. The new bookkeeping format is used for messages after the particular message. Whether the particular message is tracked using the previous or the new bookkeeping format may vary depending on the implementation. In the online approach, a single transaction with multiple dequeues from the same queue may span one or more changes to the bookkeeping representation.

In an embodiment, if high memory usage prevents in-memory synchronization of dequeues for a range of existing messages or a range of new messages, bit-level bookkeeping can fall back to row-level bookkeeping for one or more consumers on one or more queues. When memory usage subsides, the one or more consumers on one or more queues can return to using bit-level bookkeeping. Additionally, the number of consumers and/or queues using bit-level bookkeeping may be dynamically adjusted based on the level of memory usage in the database system.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A client may issue a series of requests, such as requests for execution of queries, to a database server by establishing a database session. A database session comprises a particular connection established for a client to a database server, such as a database instance, through which the client may issues the series of requests. The database server may maintain database session state data about the session. The database session state data reflects the current state of the database session and may contain the identity of the user for which the database session is established, services used by the user, instances of object types, language and character set data, statistics about resource usage for the database session, temporary variable values generated by processes executing software within the database session, and storage for cursors and variables and other information. The database session state data may also contain execution plan parameters configured for the database session. In some embodiments, a dequeue session may be a database session.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
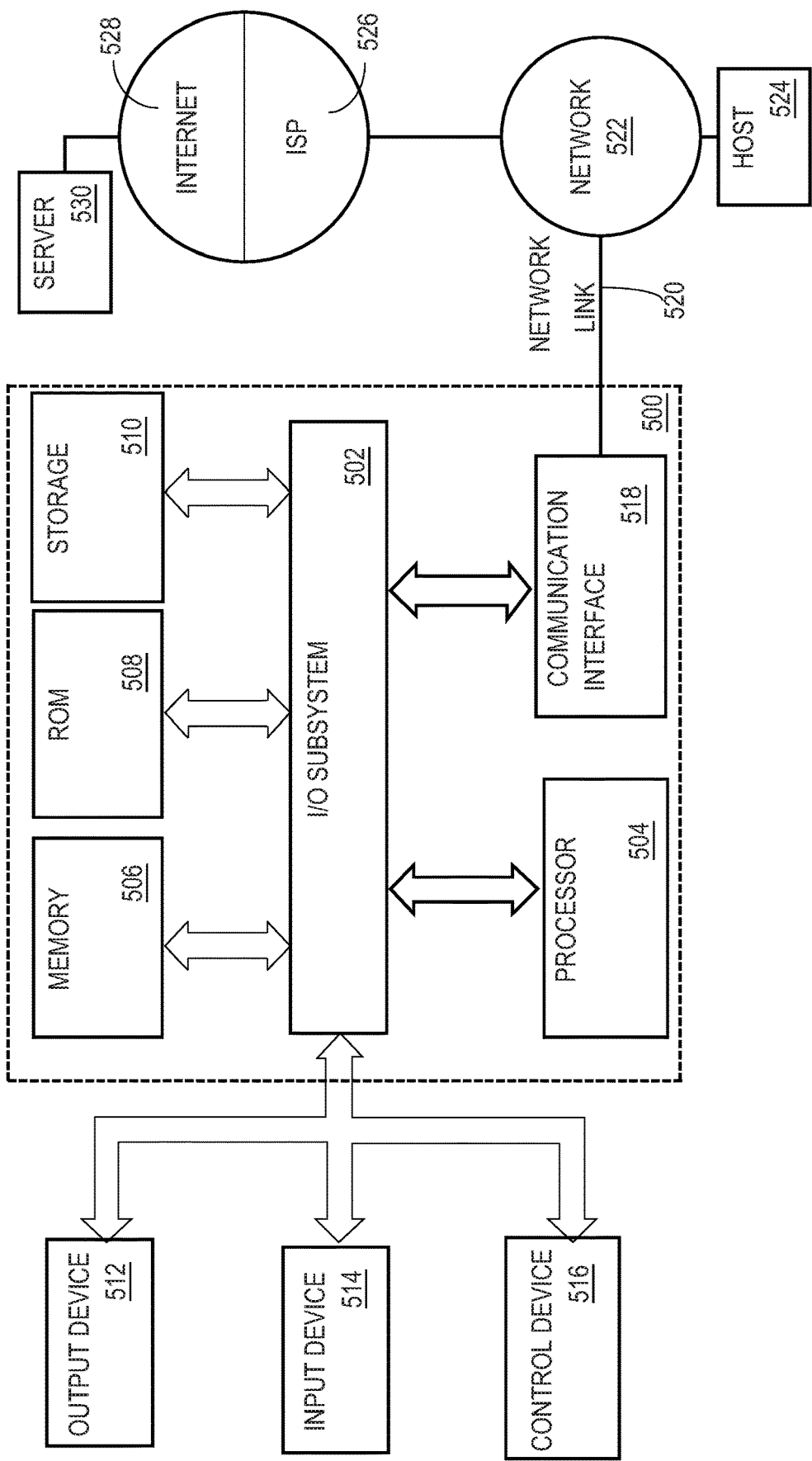
FIG. 5 illustrates a computer system upon which one or more embodiments may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED)

display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:
   storing, in a database, a bookkeeping table associated with a plurality of messages in a queue;
   wherein:
      the bookkeeping table comprises a plurality of columns in a plurality of rows,
      each column of the plurality of columns in each row of the plurality of rows corresponds to a table cell that stores a respective sequence of bits, and
      each bit in the respective sequence of bits stores a dequeue status of a respective message in the plurality of messages;
   maintaining, in volatile memory, in-memory bookkeeping data corresponding to the bookkeeping table, wherein the in-memory bookkeeping data comprises a plurality of bits indicating dequeue statuses of the plurality of messages;
   dequeuing, from the queue, one or more messages of the plurality of messages in a dequeue session;
   in response to the dequeuing the one or more messages of the plurality of messages in the dequeue session, updating, in the in-memory bookkeeping data, one or more bits that store a dequeue status of each particular message of the one or more messages, wherein the updating locks the one or more bits on a bit-by-bit basis to allow for dequeue statuses of multiple messages being updated at approximately the same time;
   in response to the dequeue session committing the dequeuing the one or more messages of the plurality of messages, synchronizing the bookkeeping table with changes to the in-memory bookkeeping data, wherein each bit stored in the bookkeeping table that corresponds to a message dequeued by the dequeue session is updated to indicate that the messages has been dequeued.

2. The method of claim 1 further comprising updating one or more bits in the in-memory bookkeeping data in response to rolling back a database transaction.

3. The method of claim 1 wherein the synchronizing the bookkeeping table with changes to the in-memory bookkeeping data is in response to committing a database transaction.

4. The method of claim 1 further comprising updating one or more bits corresponding to one or more particular messages in the plurality of messages that have been dequeued.

5. The method of claim 1 further comprising updating one or more columns in one or more rows of the plurality of rows by a plurality of consumers, wherein each bit in the respective sequence of bits corresponds to the dequeue status of a particular message in the plurality of messages by a particular consumer of the plurality of consumers.

6. The method of claim 5 wherein each row of the plurality of rows corresponds to a particular consumer of the plurality of consumers.

7. The method of claim 5 wherein each row of the plurality of rows corresponds to a particular message of the plurality of messages.

8. The method of claim 1 further comprising receiving an indication that a particular message has been reserved for dequeue, and updating, in the volatile memory, one or more bits corresponding to the particular message to indicate that the particular message has been reserved for dequeue.

9. The method of claim 1 further comprising compressing the in-memory bookkeeping data.

10. One or more non-transitory computer-readable media storing instructions which, when executed by one or more hardware processors, cause:
storing, in a database, a bookkeeping table associated with a plurality of messages in a queue;
wherein:
the bookkeeping table comprises a plurality of columns in a plurality of rows,
each column of the plurality of columns in each row of the plurality of rows corresponds to a table cell that stores a respective sequence of bits, and
each bit in the respective sequence of bits stores a dequeue status of a respective message in the plurality of messages;
maintaining, in volatile memory, in-memory bookkeeping data corresponding to the bookkeeping table, wherein the in-memory bookkeeping data comprises a plurality of bits indicating dequeue statuses of the plurality of messages;
dequeuing, from the queue, one or more messages of the plurality of messages in a dequeue session;
in response to the dequeuing the one or more messages of the plurality of messages in the dequeue session, updating, in the in-memory bookkeeping data, one or more bits that store a dequeue status of each particular message of the one or more messages, wherein the updating locks the one or more bits on a bit-by-bit basis to allow for dequeue statuses of multiple messages being updated at approximately the same time;
in response to the dequeue session committing the dequeuing the one or more messages of the plurality of messages, synchronizing the bookkeeping table with changes to the in-memory bookkeeping data, wherein each bit stored in the bookkeeping table that corresponds to a message dequeued by the dequeue session is updated to indicate that the messages has been dequeued.

11. The one or more non-transitory computer-readable media of claim 10, the instructions further comprising instructions which, when executed by the one or more hardware processors, cause updating one or more bits in the in-memory bookkeeping data in response to rolling back a database transaction.

12. The one or more non-transitory computer-readable media of claim 10 wherein the synchronizing the bookkeeping table with changes to the in-memory bookkeeping data is in response to committing a database transaction.

13. The one or more non-transitory computer-readable media of claim 10 wherein the instructions further cause updating one or more bits corresponding to one or more particular messages in the plurality of messages that have been dequeued.

14. The one or more non-transitory computer-readable media of claim 10 wherein the instructions further cause updating one or more columns in one or more rows of the plurality of rows by a plurality of consumers, wherein each bit in the respective sequence of bits corresponds to the dequeue status of a particular message in the plurality of messages by a particular consumer of the plurality of consumers.

15. The one or more non-transitory computer-readable media of claim 14 wherein each row of the plurality of rows corresponds to a particular consumer of the plurality of consumers.

16. The one or more non-transitory computer-readable media of claim 14 wherein each row of the plurality of rows corresponds to a particular message of the plurality of messages.

17. The one or more non-transitory computer-readable media of claim 10 further comprising instructions which, when executed by the one or more hardware processors, cause receiving an indication that a particular message has been reserved for dequeue, and updating, in the volatile memory, one or more bits corresponding to the particular message to indicate that the particular message has been reserved for dequeue.

18. The one or more non-transitory computer-readable media of claim 10 further comprising instructions which, when executed by the one or more hardware processors, cause compressing the in-memory bookkeeping data.

* * * * *